(12) United States Patent
Ward et al.

(10) Patent No.: US 6,318,898 B1
(45) Date of Patent: Nov. 20, 2001

(54) CORROSION-RESISTANT BEARING AND METHOD FOR MAKING SAME

(75) Inventors: Robert E. Ward, Simpsonville; Thomas W. Shorts, Seneca, both of SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/419,490

(22) Filed: Oct. 15, 1999

(51) Int. Cl.[7] .................................................... F16C 33/32
(52) U.S. Cl. ............................................ 384/492; 384/913
(58) Field of Search ...................................... 384/492, 476, 384/513, 912, 913; 29/898.066, 898.12, 898.13

(56) References Cited

U.S. PATENT DOCUMENTS

| | | | |
|---|---|---|---|
| 4,253,714 | * | 3/1981 | Bhushan ...................... 29/148.4 L X |
| 5,482,385 | * | 1/1996 | Yokota et al. ..................... 384/913 X |
| 5,803,614 | * | 9/1998 | Tsuji et al. ........................ 384/912 X |
| 5,879,816 | * | 3/1999 | Mori et al. ........................ 384/913 X |
| 5,952,085 | * | 9/1999 | Rickerby et al. ................. 384/912 X |
| 5,955,202 | * | 9/1999 | Steeg et al. ....................... 384/912 X |
| 6,030,681 | * | 2/2000 | Czubarow et al. .................. 428/65.3 |
| 6,062,735 | * | 5/2000 | Ward ..................................... 384/492 |
| 6,139,191 | * | 10/2000 | Andler et al. ..................... 384/912 X |

* cited by examiner

Primary Examiner—Rodney H. Bonck
Assistant Examiner—Roger Pang
(74) Attorney, Agent, or Firm—Patrick S. Yoder; Alexander M. Gerasimow; William R. Walbrun

(57) ABSTRACT

A corrosion-resistant antifriction bearing is disclosed that includes a multi-layer corrosion protection system over a metallic substrate. The corrosion-resistant system may be applied to a single or multiple components of the bearing, including inner and outer rings, bearing elements, collars, and so forth. The system includes a nickel-phosphorous alloy plating layer applied by an autocatalytic process after surface preparation of the protected component. The surface preparation aids in adherence of the nickel-phosphorous alloy plating layer to the substrate. The preparation may include the application of rust inhibitors, liquid vapor honing, acid neutralizing, and so forth. Additional topcoat layers may be applied to the nickel-phosphorous alloy plating layer. These may include a chromate conversion coating and a polymeric topcoat layer. The polymeric topcoat layer, such as polytetrafluoroethylene, may include a UV marker to enable identification of the bearing when placed in service and throughout its useful life.

25 Claims, 3 Drawing Sheets

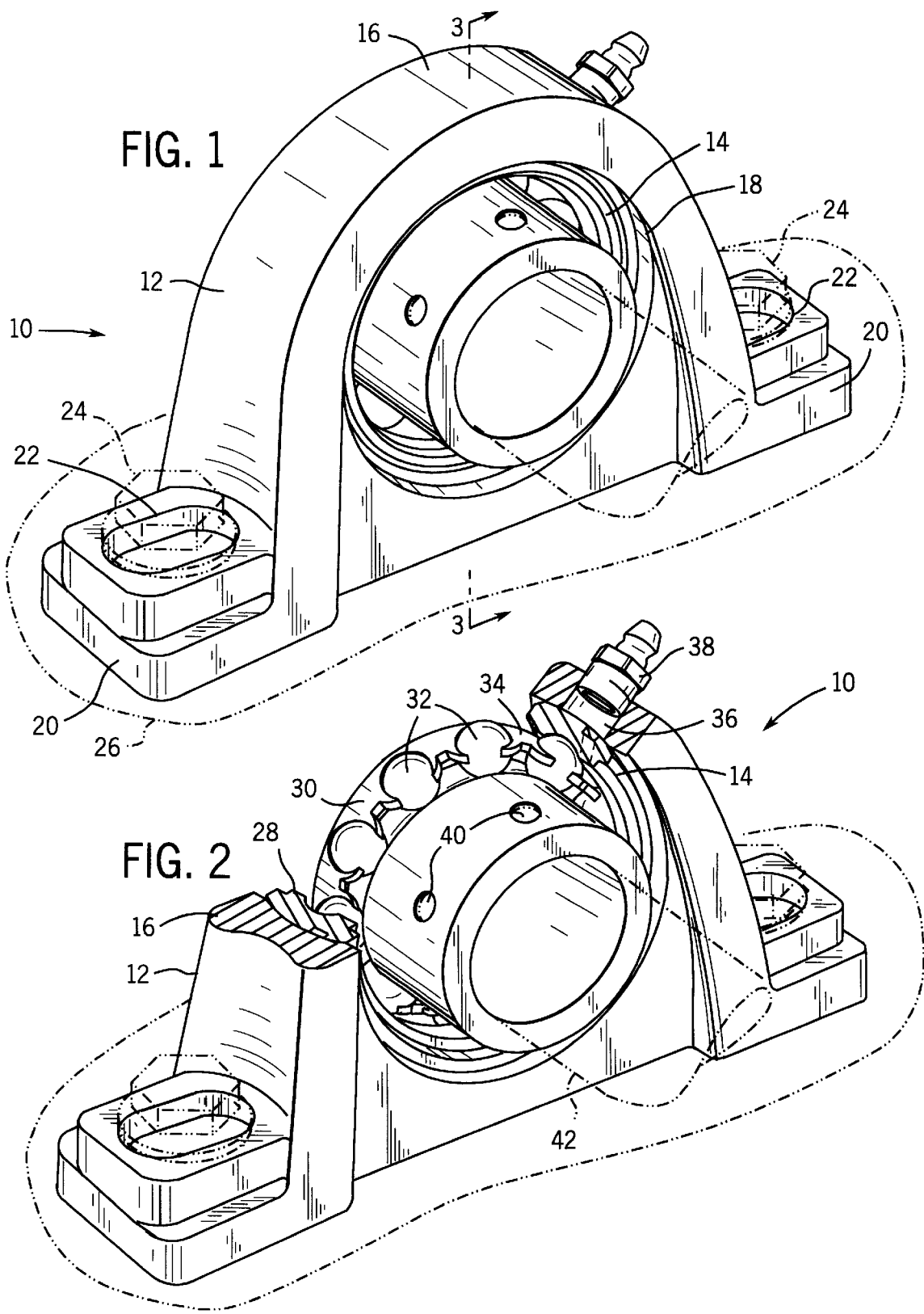

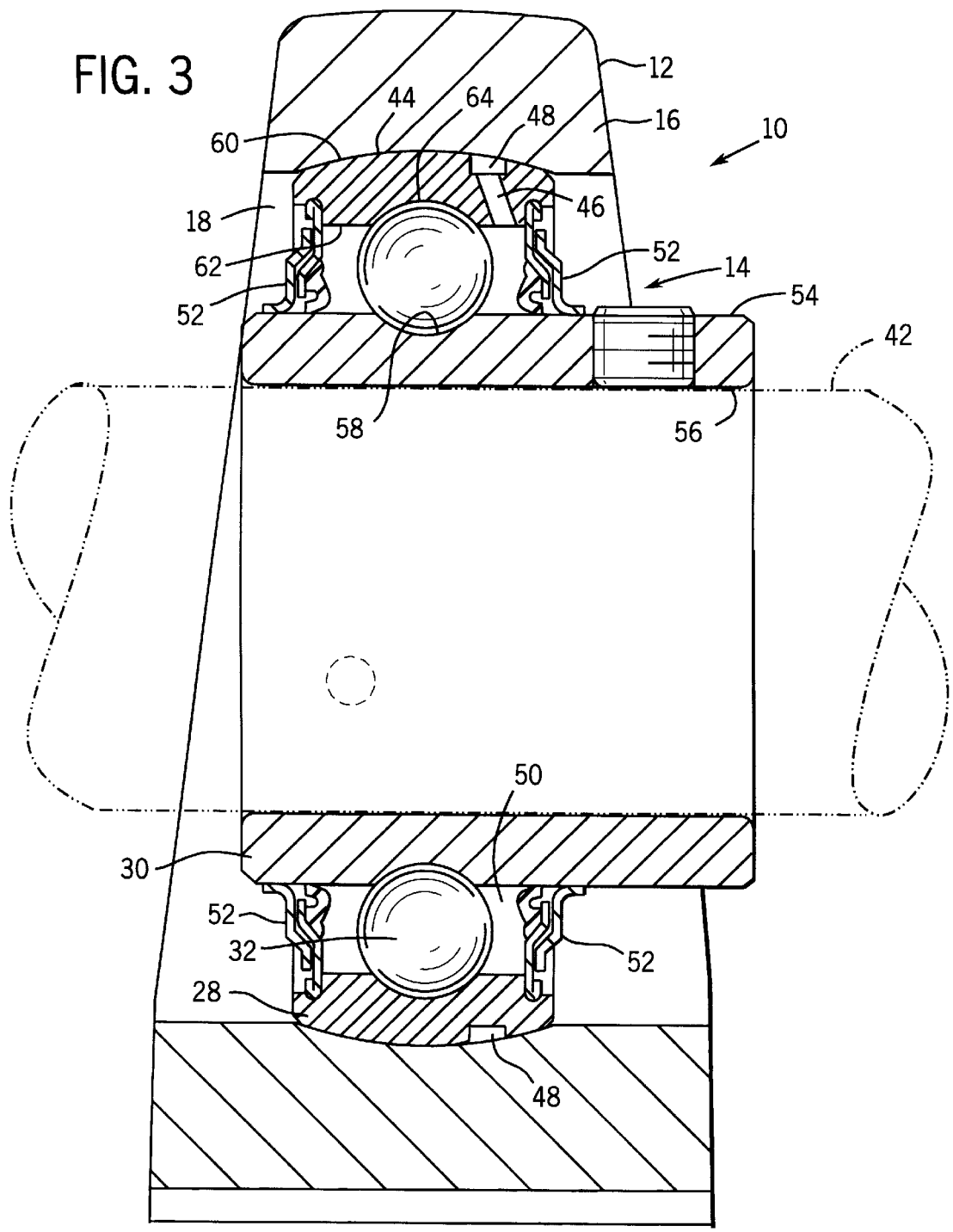

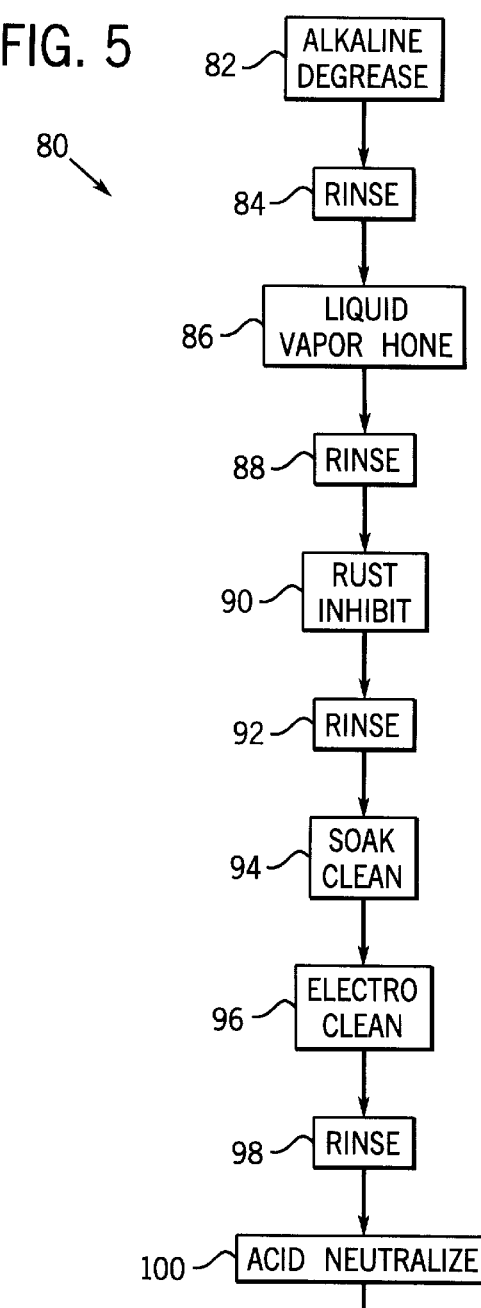
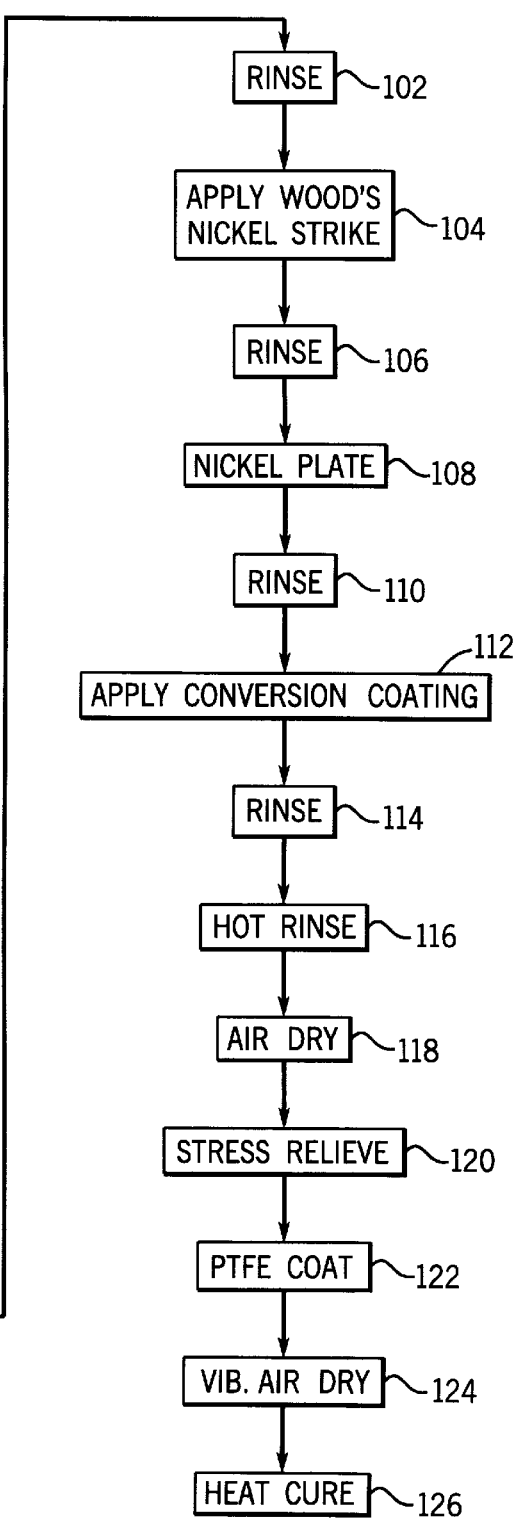
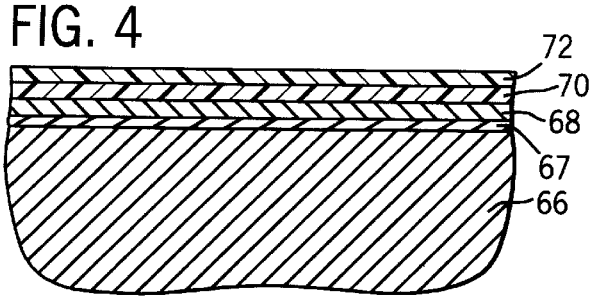

CORROSION-RESISTANT BEARING AND METHOD FOR MAKING SAME

BACKGROUND OF THE INVENTION

1. Field of the Invention

The present invention relates generally to the field of antifriction bearings for use in mechanical systems. More particularly, the invention relates to a technique for rendering bearing components corrosion-resistant for use in food and beverage, chemical, marine, and similar potentially corrosive applications.

2. Description of the Related Art

A wide variety of applications exist in all technical fields for antifriction bearings used in rotary equipment. In general, in rotary applications, such bearings are used to reduce frictional contact between a rotary member and a stationary member, or between two rotating elements. In many applications, one of the elements may be fixed to a support structure, such as a machine housing or frame. The bearing is mounted to the support structure via a bearing housing and receives the rotating element in a central aperture. Rotating elements are typically configured as shafts, shaft extensions, hubs, and the like. In many applications one of several relatively standard housings may be employed, providing the desired support for the bearing and shaft, with the bearing being received in one of a number of ways within a recess provided in the housing.

A number of applications exist for antifriction bearings in environments which may degrade, corrode or otherwise attack the bearing components, as well as other elements of the mechanical transmission system. For example, in many chemical and marine environments, water, and other liquids, as well as trace chemicals such as salts, corrosives, acids, and the like in the air surrounding the bearings may chemically attack the bearing components. In other applications, such as in the food and beverage industry, frequent wash downs of production or processing lines with water and detergents or high pressure steam may both chemically and mechanically attack the bearings components. In either case, degradation of the bearing components may take the form of oxidation products, such as white or red rust on ferrous substrates. In applications such as those in the food and beverage industry, this degradation is unacceptable, and may call for immediate replacement of affected bearings, leading to additional expense and possible down time.

Several conventional approaches have been developed to inhibit, or at least to forestall bearing component degradation in demanding application environments. In one relatively simple solution, expensive and somewhat exotic materials may be employed in the components which make them less susceptible to common corrosion. For example, in antifriction bearings, components such as collars, races, balls, rollers, and so forth, may be made of stainless steel or a similar corrosion-resistant metal. Moreover, bearing components may be plated with galvanic layers, such as layers including cadmium or zinc, sometimes alloyed with other metals. Such plated layers act as sacrificial materials which corrode before the underlying substrate, thereby forestalling eventual replacement of the bearing. In another common technique, mechanical plated layers, such as chrome, may be applied to the substrate to provide an aesthetically pleasing outer appearance, as well as a mechanical barrier to corrosive products.

While such solutions to rendering antifriction bearings corrosion-resistant are often effective, they are not without drawbacks. For example, materials such as stainless steel can be cost prohibitive for a number of applications and, consequently, their use is often limited to cases of actual need where such high costs are justified. Galvanic plating is also useful, but may lead to undesirable environmental considerations, particularly disposal of solutions and other processing by-products, such as in the case of cadmium, or to problems with appearance and wear, as in the case of certain zinc and zinc alloy plating techniques. Finally, mechanical layers such as chrome require fairly specialized and somewhat costly plating processes, and can also result in relatively undesirable by-products.

There is a need, therefore, for improved corrosion-resistant bearings and bearing components which avoids these drawbacks of heretofore known structures. There is a particular need at present for a cost-effective process for rendering bearing components corrosion-resistant, which can be applied in a relatively straightforward manner, which wears well, and which provides an aesthetically pleasing product, both upon installation and during a reasonable useful life.

SUMMARY OF THE INVENTION

The invention provides a corrosion-resistant bearing and bearing components designed to respond to these needs. The components may be made of any suitable substrate, typically an alloy steel. The substrate may be formed by turning, stamping, forging, or any suitable mechanical process. The substrate is then plated with a nickel layer in an autocatalytic process to deposit a thin layer of nickel over the substrate. Prior to deposition of the nickel plating layer, the substrate may be prepared through a series of steps including liquid vapor honing, application of a rust inhibitor, electrocleaning, acid neutralizing, and application of a plating preparation layer such as Wood's nickel strike. Additional protective and finishing layers may be provided over the nickel plating, such as a conversion coating, as well as a polymeric coating. The polymeric coating, which may consist of such compounds as polytetrafluoroethylene, may carry a marker, such as an ultraviolet fluorescent marker.

When placed into service, the bearing and bearing components produced by the technique exhibit superior resistance to corrosion as compared to other mechanicallyprotected bearing components. Moreover, the nickel plating technique of the invention is more cost-effective and less environmentally problematic than conventional chrome plating. Furthermore, the provision of a fluorescent marker in the coating or finishing layers of the structures allows operations personnel to rapidly distinguish between the corrosion-resistant bearings and other bearings, both during initial installation, subsequent servicing, and throughout the life of the bearings, as the protected components are worn or age. The nickel plating and top coat layers provide an aesthetically attractive product, comparable to polished stainless steel.

BRIEF DESCRIPTION OF THE DRAWINGS

The foregoing and other advantages and features of the invention will become apparent upon reading the following detailed description and upon reference to the drawings in which:

FIG. 1 is a perspective view of a bearing including a bearing set protected by a technique in acco ce with aspects of the present invention disposed within a bearing housing;

FIG. 2 is a prospective view of the bearing illustrated in FIG. 1 with a portion of the housing broken away to illustrate the interior components of the bearing set;

FIG. 3 is a sectional view of the bearing shown in FIGS. 1 and 2, sectioned along line 3—3 of FIG. 1, to illustrate the various components of the bearing set;

FIG. 4 is a sectional view illustrating protective layers disposed on a substrate of a component of the bearing shown in FIGS. 1–3 in accordance with certain aspects of the present technique; and, FIG. 5 is a flow chart illustrating steps in preparing a corrosion-resistant bearing component with layered protection of the type shown in FIG. 3.

DETAILED DESCRIPTION OF SPECIFIC EMBODIMENTS

Turning now to the drawings, and referring first to FIGS. 1 and 2, a bearing, designated generally by the reference numeral 10, is illustrated as including a housing 12 and a bearing insert 14 positioned in the housing. In the embodiment illustrated in the FIGS., housing 12 is a pillow block style housing, including a central support 16 through which an aperture 18 is formed for receiving bearing insert 14. Attachment flanges or feet 20 extend from central support 16 and include apertures 22 designed to receive fasteners 24 for securing bearing 10 to a support surface 26.

As best illustrated in FIG. 2, the bearing insert shown includes an outer ring 28, an inner ring 30, and a plurality of bearing elements 32 in the form of ball bearings received between the outer and inner rings. The bearing elements may be conveniently positioned in a retainer or cage 34 and are free to rotate within the cage and with respect to the inner and outer rings to provide for free rotation of one ring with respect to another. Also as illustrated in FIG. 2, central support 16 of housing 12 includes a lubricant passage 36 in which a lubricant fitting 38 is positioned. As described more fully below, lubricant fitting 38 permits lubricant, such as grease, to be pumped into the region between outer and inner rings 28 and 30 via passage 36, thereby providing lubrication for the bearing components, and inhibiting the ingress of dirt and contamination into the operational region of the bearing elements. Also as shown in FIG. 2, inner ring 30 may include one or more threaded apertures 40 for receiving set screws or similar fasteners used to properly position a shaft 42 in bearing 10.

As will be appreciated by those skilled in the art, the present technique for preventing or inhibiting corrosion of bearing components may be applied to various styles and configurations of bearings. For example, while the pillow block style bearing housing is illustrated in the FIGS., the present technique may be applied to bearing housings in two or four-bolt flanged bearing housings, tapped-base housings, and so forth. Similarly, the present technique may be applied to a variety of designs of bearing inserts. Thus, while ball bearings are illustrated in the FIGS., the technique may be equally well applied to bearing assemblies including needle bearings, roller bearings, tapered roller bearings, thrust bearings, journal bearings, and so forth. Moreover, the present technique may be used in bearing arrangements permitting lubrication and access to internal volumes, or in sealed arrangements.

FIG. 3 illustrates the bearing of FIGS. 1 and 2 in vertical section. As shown in FIG. 3, housing 12 preferably forms a spherical bearing seat 44 surrounding aperture 18. Bearing insert 14 is received within and supported by this spherical bearing seat. A lubricant passage 46 may be formed in outer ring 28, in fluid communication with an annular groove 48 formed in the outer ring to permit lubricant to be transmitted from the annular lubricant groove into an interior cavity 50 formed between outer ring 28 and inner ring 30 in which bearing elements 32 are positioned. Moreover, seal assemblies 52 are provided between outer ring 28 and inner ring 30 to maintain lubricant thus injected into cavity 50, and to prevent the ingress of contaminants, water, and so forth, into the cavity.

In accordance with the present technique, one or more of the bearing components is provided with protective corrosion-resistant layers to form a corrosion-resistant system. Such layers may be provided on surfaces of outer ring 28, inner ring 30, or on additional components included in the bearing insert or housing. In the illustrated embodiment, for example, inner ring 30 includes an outer surface 54, an inner surface 56, and forms, along outer surface 54, an inner race 58. As best shown in FIG. 3, inner race 58 is designed to receive and bear against bearing components 32 positioned between the inner and outer rings. Similarly, outer ring 28 includes an outer surface 60, an inner surface 62, and an outer race 64 formed as an annular groove within inner surface 62. The corrosion-resistant system may extend over any or all of surfaces 54, 56, 58, 60, 62 and 64, as well as over additional surfaces between these surfaces, or over surfaces of housing 12, where desired. In the following discussion, however, reference is made to specific regions of the inner ring 30 for the sake of simplicity. A detailed view of the corrosion-resistant system in these regions are best illustrated in FIG. 4.

Referring first to the region shown in detail in FIG. 4, the corrosion-resistant system in such regions preferably includes a plurality of corrosion inhibiting layers, including an electroless nickel plating layer, and a multi-layer mechanical protective structure. In particular, in accordance with a presently preferred embodiment, the bearing component, such as inner ring 30, comprises a metallic substrate 66 which may be made of any suitable material, such as steel. To protect and inhibit corrosion of the surface of the substrate 66, a plating layer 68 of autocatalytically applied metal is formed over at least a portion of the substrate. Both the metallic substrate 66 and plating layer 68 are, in turn, protected by one or more barriers comprising the protective structure, thereby inhibiting exposure of the substrate and plating layer to corrosive elements and protecting the substrate and plating layer from mechanical damage such as scratching and wear. The outer protective layers also preferably provide an aesthetically desirable finish appearance in the final product and facilitate inspection by maintenance personnel for signs of corrosion.

In the presently preferred embodiment illustrated in FIG. 4, an electrolytically applied nickel layer 67, such as Wood's strike, is applied on substrate 66 after preparation of the substrate surface to accept the plating. An autocatalytic nickel/phosphorous alloy layer 68 is then deposited on layer 67. The nickel/phosphorous plating layer 68 is preferably applied to a nominal thickness of approximately between 0.00005 and 0.0005 inches, and preferably approximately 0.000250 inches (6.35 $\mu$m) or below over the entire surface of the bearing component. In the preferred embodiment it has been found that a composition of layer 68 of from 10–13% phosphorous by weight provides excellent corrosion resistance. For a brighter cosmetic appearance, a lower phosphorous content may be provided in layer 68, such as 5–9%. Moreover, all of the components of the bearing structure described above may be plated in this manner. In heretofore known corrosionresistant bearing products, more exotic materials have been used, such as cadmium or chrome platings, due to a persistent belief that an electroless nickel plating layer could not be made to adhere sufficiently to the substrate material to prevent flaking or abnormal wear when placed in service. However, it has been found that in accordance with the present technique, the autocatalytically applied nickel plating layer can be disposed over the surfaces of the substrate to provide the desired corrosion resistance without significant adhesion problems.

In one embodiment as illustrated in FIG. 4, a conversion coating 70 is applied as part of the corrosion inhibiting system. Suitable coatings of this type have been found to include a commercially available chromate conversion coating available from McGean-Rohco, Inc. under the designation Rodip. As will be appreciated by those skilled in the art, such chromate conversion coatings may be applied directly to the nickel plating layer. In the preferred embodiment, the conversion coating layer is applied to a thickness of approximately 0.00001 inches.

As a further corrosion inhibiting and finishing layer, in the embodiment of FIG. 4, a top coat 72 of polytetrafluoroethylene (PTFE) is applied over layer 70. The PTFE layer is preferably provided with an ultraviolet fluorescent marker. The PTFE is preferably formed to a thickness of approximately 0.0002 inches.

The resulting corrosion-resistant system may be subjected to the pressures of normal wear during the life of the bearing assembly, and provides superior corrosion protection in an economical manner. Where provided, the conversion coating offers an enhanced corrosion protection over that provided by the nickel deposit itself. The final top coat layer provides an additional barrier to corrosive attack. Where the top coat layer contains an ultraviolet fluorescent marker, the resulting component fluoresces when exposed to an ultraviolet light source. The marker may thus be used to provide assurance to the manufacturer and to the end user that a corrosion-resistant bearing component has been obtained or is being installed. Moreover, the ultraviolet marker provides an in-application indicator to the customer that the useful corrosion protected life of the bearing is approaching an end, typically indicated by a gradual fading and eventual disappearance of the UV marker. It should be noted, however, that the fading does not indicate a complete wear of the remaining corrosion-resistant layers through to the substrate material, but may be used to indicate progressive wear. Finally, the combination of the foregoing protective layers provides a cosmetic post-plate appearance which is both satin bright and highly lustrous, resembling the appearance of polished stainless steel.

The foregoing structure has been demonstrated to provide effective corrosion protection in excess of 300 hours of continuous exposure to 5% neutral salt fog (ASTM B 117). Moreover, the standard life rating specifications of bearings to which the system is applied may be generally maintained in conformance with heretofore known products, such as chrome-plated bearings. Furthermore, typical de-rating specifications employed for other plated or stainless steel bearings are not required of the foregoing structure.

FIG. 5 indicates exemplary steps for applying the layers described above to a bearing component substrate in accordance with aspects of the present technique. The method, indicated generally by reference numeral 80, begins with a pre-formed bearing component, including the final features needed for the end product, or at least those to which the corrosion-resistant system is to be applied. As indicated in FIG. 5, at step 82 the substrate is alkaline degreased. This step may be performed with a biodegradable degreaser, such as Clepo-455-A available from McDermid of Waterbury, Conn. At step 84 the clean substrate is cold water rinsed. At step 86 the substrate is liquid vapor honed. This step may be performed through any suitable method, such as honing employing compounds such as fine grit aluminum oxide. At step 88 the substrate is again cold water rinsed. At step 90 a rust inhibitor is applied to the cleaned substrate. This rust inhibitor is preferably a non-petroleum rust inhibiting product, such as NRP-Oakite from Oakite Products, Inc. of Berkeley Heights, N.J. The rust inhibitor may be applied by any suitable process, such as immersion. At step 92 the resulting substrate is again cold water rinsed.

The substrate is next prepared for nickel plating. This preparation may include various preparatory steps, such as those indicated in FIG. 5, beginning at step 94. At step 94 the substrate is soak cleaned, such as in a solution of Kemtex-88 from McDermid of Waterbury, Conn. At step 96 the substrate is electro-cleaned, such as by Kemtex-88. At step 98 the substrate is again cold water rinsed and, at step 100 the structure is acid neutralized. This acid neutralization may be performed by application of weak sulfuric acid. At step 102 the substrate is rinsed. At step 104 a preparatory solution is applied to the substrate, preferably Wood's nickel strike. As will be appreciated by those skilled in the art, such materials may be obtained commercially from various sources, such as Atotech USA of Fort Mill, S.C., and are applied by an electroplating process. Following application of the nickel strike, the substrate is rinsed as indicated at step 106, and is nickel plated at step 108.

In the present process, the plating performed at step 108 is done by an autocatalytic process. The process proceeds by positioning the substrates in a chemical bath and causing an autocatalytic reaction (reduction) to deposit nickel/phosphorous layer 68 on the surface of the base layer 67. Various chemical baths may be commercially obtained, such as from Atotech USA. The composition of the bath employed for the plating process is subject to some variation depending upon the chemicals and compositions employed, but is generally an aqueous solution of nickel and phosphorous. The thickness of the resulting plated layer is generally a function of the chemistry employed in the bath, the temperature to which the bath is raised, and the duration of time to which the parts are subjected to the heated bath, and preferably falls within the range described above. However, as opposed to electrolytic processes, such autocatalytic plating generally does not require the parts to be manually mounted in support structures, coupled to electrodes, moved within the support structures to provide overall plating of the surfaces, and so forth.

At step 110 in FIG. 5, the plated substrate is cold water rinsed. At step 112 the conversion coating, such as a clear chromate conversion coating, may be applied. Where desired at step 114 the coated substrate is first cold water rinsed, then at step 116 is hot water rinsed in a bath at approximately 160° Fahrenheit. At step 118 the coated, cleaned substrate is air dried. At step 120, the substrates may be heat treated, such as for stress relief. In a presently preferred embodiment, stress relief is performed at step 120 by positioning the substrates in a heat treating oven at approximately 375° Fahrenheit for a period of four hours. At step 122, the coated substrates are PTFE coated. Commercially available PTFE coatings, with and without ultraviolet fluorescent markers, are commercially available from various manufacturers, such as RO-59, Inc. of Stoughton, Mass. At step 124 the coated substrates are vibratory air dried. At step 126, where desired, the coating applied at step 122 is heat cured, such as by subjecting the plated and coated substrate to a temperature of approximately 200° Fahrenheit for a period of 30 minutes.

While the invention may be susceptible to various modifications and alternative forms, specific embodiments have been shown by way of example in the drawings and have been described in detail herein. However, it should be understood that the invention is not intended to be limited to the particular forms disclosed. For example, the technique may be applied to any type of bearing product, including ball, roller, and needle antifriction annular bearings, as well as to linear bearings and plain bearings. Rather, the invention is to cover all modifications, equivalents, and alternatives falling within the spirit and scope of the invention as defined by the following appended claims.

What is claimed is:

1. A method for making a corrosion resistant antifriction bearing, the bearing having a plurality of components including an inner race, an outer race and a plurality of antifriction elements disposed between the inner and outer races, the method comprising the steps of:

forming a metallic component substrate;

preparing an outer surface of the substrate to accept a plating layer;

applying a corrosion resistant coating to the prepared substrate surface, the corrosion resistant coating including an autocatalytic nickel-phosphorous alloy plating layer; and applying a polymeric surface layer over the corrosion resistant coating.

2. The method of claim 1, wherein the nickel-phosphorous alloy plating layer includes a phosphorous content of from 5–13% phosphorous by weight.

3. The method of claim 2, wherein the nickel-phosphorous alloy plating layer includes a phosphorous content of from 10–13% phosphorous by weight.

4. The method of claim 1, wherein the step of preparing the outer surface includes the step of liquid vapor honing the substrate surface.

5. The method of claim 1, wherein the step of preparing the outer surface includes the step of applying a rust inhibitor to the substrate surface.

6. The method of claim 1, wherein the step of applying a corrosion resistant coating includes applying a chromate conversion coating over the nickel-phosphorous alloy plating layer.

7. The method of claim 1 wherein the polymeric layer includes a layer of polytetrafluoroethylene.

8. The method of claim 1, wherein the polymeric layer includes an ultraviolet marker for identifying the presence of the corrosion resistant coating under ultraviolet light.

9. A method for making a corrosion resistant component for an antifriction bearing, the method comprising the steps of:

forming a component substrate of a ferrous metal;

preparing a surface of the substrate by applying a rust inhibitor;

applying an electrolytic nickel layer to the substrate;

applying an autocatalytic nickel-phosphorous alloy plating layer to the substrate having a phosphorous content of between 5–13% by weight of phosphorous; and applying a topcoat layer to the nickel-phosphorous alloy plating layer.

10. The method of claim 9, wherein the nickel-phosphorous alloy plating layer includes a phosphorous content of from 10–13% phosphorous by weight.

11. The method of claim 9, wherein the step of preparing the surface of the substrate includes liquid vapor honing the substrate surface prior to application of the rust inhibitor.

12. The method of claim 9, wherein the autocatalytic nickel-phosphorous alloy plating layer is applied to a thickness of approximately 0.00005–0.0005 inches.

13. The method of claim 9, wherein the autocatalytic nickel-phosphorous alloy plating layer is applied to a thickness of approximately 0.00025 inches.

14. The method of claim 9, wherein the topcoat layer includes a chromate conversion layer applied over the nickel-phosphorous alloy plating layer.

15. The method of claim 9, wherein the topcoat layer includes a polymeric coating layer.

16. The method of claim 15, wherein the polymeric coating layer includes an ultraviolet marker.

17. A corrosion resistant anti-friction bearing comprising:

a first bearing component;

a second bearing component; and a plurality of bearing elements disposed between the first and second bearing components;

wherein at least one of the first and second bearing components is a corrosion resistant component including a metallic substrate, a nickel-phosphorous alloy plating layer disposed over the substrate, and a topcoat layer disposed over the nickel-phosphorous alloy plating layer, the nickel-phosphorous alloy plating layer including a phosphorous content of from 5–13% phosphorous by weight.

18. The bearing of claim 17, wherein the nickel-phosphorous alloy plating layer includes a phosphorous content of from 10–13% phosphorous by weight.

19. The bearing of claim 17, wherein the corrosion resistant component includes a rust inhibiting layer beneath the nickel-phosphorous alloy plating layer.

20. The bearing of claim 17, wherein the nickel-phosphorous alloy plating layer has a thickness of approximately between 0.00005–0.0005 inches.

21. The bearing of claim 20, wherein the nickel-phosphorous alloy plating layer has a thickness of approximately 0.00025.

22. The bearing of claim 17, wherein the topcoat layer includes a chromate conversion coating disposed over the nickel-phosphorous alloy plating layer.

23. The bearing of claim 17, wherein the topcoat layer includes a polymeric coating disposed over the nickel-phosphorous alloy plating layer.

24. The bearing of claim 23, wherein the polymeric coating includes an ultraviolet marker which fluoresces under ultraviolet light.

25. The bearing of claim 17, wherein the topcoat layer includes a chromate conversion coating disposed over the nickel-phosphorous alloy plating layer, and a polymeric coating including an ultraviolet marker.

* * * * *